US011135512B2

(12) United States Patent
Abe et al.

(10) Patent No.: US 11,135,512 B2
(45) Date of Patent: Oct. 5, 2021

(54) INFORMATION PROCESSING APPARATUS, INFORMATION PROCESSING METHOD, AND RECORDING MEDIUM

(71) Applicant: KOEI TECMO GAMES CO., LTD., Kanagawa (JP)

(72) Inventors: Yusuke Abe, Kanagawa (JP); Mikihiro Shiozuru, Kanagawa (JP); Sho Hiroshige, Kanagawa (JP)

(73) Assignee: KOEI TECMO GAMES CO., LTD., Kanagawa (JP)

( * ) Notice: Subject to any disclaimer, the term of this patent is extended or adjusted under 35 U.S.C. 154(b) by 0 days.

(21) Appl. No.: 16/883,147

(22) Filed: May 26, 2020

(65) Prior Publication Data

US 2020/0376380 A1 Dec. 3, 2020

(30) Foreign Application Priority Data

May 31, 2019 (JP) ............................. JP2019-102248

(51) Int. Cl.
*A63F 13/537* (2014.01)
(52) U.S. Cl.
CPC .................................. *A63F 13/537* (2014.09)
(58) Field of Classification Search
CPC .................................................... A63F 13/537
See application file for complete search history.

(56) References Cited

U.S. PATENT DOCUMENTS

| 5,507,485 A * | 4/1996 | Fisher ..................... A63B 71/06 |
| | | 473/407 |
| 8,002,633 B2 | 8/2011 | Shimizu |
| 2002/0082080 A1* | 6/2002 | Kojima ............... A63F 13/5252 |
| | | 463/31 |
| 2004/0192424 A1* | 9/2004 | Mori ...................... A63F 13/525 |
| | | 463/8 |
| 2005/0176486 A1* | 8/2005 | Nishimura ............ A63F 13/426 |
| | | 463/4 |

(Continued)

FOREIGN PATENT DOCUMENTS

| JP | 2004-223110 | 8/2004 |
| JP | 2011-098229 | 5/2011 |
| WO | 2014/196135 | 2/2017 |

OTHER PUBLICATIONS

"WWE 2K17 Hall of Fame Showcase—Sting vs Ric Flair—Gameplay Walkthrough Part 1." https://www.youtube.com/watch?v=bOKJzBgGH8M. Published Feb. 20, 2017. (Year: 2017).*

(Continued)

*Primary Examiner* — Reginald A Renwick
(74) *Attorney, Agent, or Firm* — IPUSA, PLLC

(57) ABSTRACT

An information processing apparatus in which a player plays a game by controlling a player character is provided. The information processing apparatus includes a memory, and a processor coupled to the memory and configured to generate a game image in accordance with an operation by the player, generate another image of another character or an object other than the player character, in a case where the another character or the object is in a state to be affected by the player character in the game, and superimpose and display the another image on the game image.

9 Claims, 10 Drawing Sheets

(56) References Cited

U.S. PATENT DOCUMENTS

| | | | |
|---|---|---|---|
| 2012/0176369 A1* | 7/2012 | Suzuki | H04N 13/398 |
| | | | 345/419 |
| 2019/0099665 A1* | 4/2019 | Miao | G06F 3/04847 |
| 2021/0049925 A1* | 2/2021 | Robinson | G06F 3/013 |

OTHER PUBLICATIONS

Office Action dated Oct. 20, 2020 (Japanese Patent Application No. 2019-102248).

* cited by examiner

FIG.6

| STATE | DISPLAY TIMING | INTERVAL |
|---|---|---|
| KNOCKED-OUT | IMMEDIATELY AFTER STATE IS CHANGED | EVERY 10 SECONDS (TIME LIMIT OF 100 SECONDS) |
| PARALYZED | 30 SECONDS AFTER STATE IS CHANGED | EVERY 30 SECONDS |
| LOW HIT POINTS | 30 SECONDS AFTER STATE IS CHANGED | — |
| ⋮ | ⋮ | ⋮ |

FIG.7

| UNIT ID | UNIT TYPE | STATE | CURRENT COORDINATES | ... |
|---|---|---|---|---|
| u001 | PLAYER CHARACTER | NORMAL | (0, 50, 100) | ... |
| u002 | PLAYER CHARACTER | KNOCKED-OUT | (150, 150, 150) | ... |
| ... | ... | ... | ... | ... |
| u010 | NPC | NORMAL | (500, 0, 200) | ... |
| ... | ... | ... | ... | ... |
| u020 | OBJECT | LOW HIT POINTS | (90, 0, 35) | ... |
| ... | ... | ... | ... | ... |

INFORMATION PROCESSING APPARATUS, INFORMATION PROCESSING METHOD, AND RECORDING MEDIUM

CROSS-REFERENCE TO RELATED APPLICATIONS

This application is based on and claims priority to Japanese Patent Application No. 2019-102248, filed on May 31, 2019, the entire contents of which are incorporated herein by reference.

BACKGROUND OF THE INVENTION

1. Field of the Invention

The disclosures herein relate to an information processing apparatus, an information processing method, and a recording medium.

2. Description of the Related Art

There is known a game apparatus in which a plurality of players participate in a game and play the game on a game screen displayed on a common display, and the game screen is divided into a plurality of areas on a per-player basis in accordance with the number of players (see Patent Document 1, for example).

However, in the game apparatus in which the game screen is divided into the plurality of areas on a per-player basis in accordance with the number of players as described in Patent Document 1, there is a problem in that the areas divided on a per-player basis are small. Conversely, in cooperative gameplay in which a plurality of players participate, if other players' screens are not displayed, it would be difficult to understand the other players' situations.

RELATED-ART DOCUMENTS

Patent Documents

Patent Document 1: Japanese Laid-open Patent Publication No. 2004-223110

SUMMARY OF THE INVENTION

It is an object of the present disclosure to provide a new mechanism that superimposes and displays, on a game image, another image of another character or an object that is in a state to be affected by a player character.

According to an aspect of the present disclosure, an information processing apparatus in which a player plays a game by controlling a player character is provided. The information processing apparatus includes a memory, and a processor coupled to the memory and configured to generate a game image in accordance with an operation by the player, generate another image of another character or an object other than the player character, in a case where the another character or the object is in a state to be affected by the player character in the game, and superimpose and display the another image on the game image.

BRIEF DESCRIPTION OF THE DRAWINGS

Other objects and further features of the present invention will be apparent from the following detailed description when read in conjunction with the accompanying drawings, in which:

FIG. 6 is a diagram illustrating an example of a sub-image display condition table according to an embodiment;

FIG. 7 is a diagram illustrating an example of a unit table according to an embodiment;

DESCRIPTION OF THE EMBODIMENTS

According to an aspect of the present disclosure, it is possible to provide a new mechanism that superimposes and displays, on a game image, another image of another character or an object that is in a state to be affected by a player character.

In the following, embodiments of the present invention will be described with reference to the accompanying drawings. In the embodiments, an example of cooperative play will be described, in which a plurality of players controlling respective player characters work together to play a game. However, the present invention is not limited to cooperative play. Further, the term "player character" refers to an in-game object controlled by a player.

[Game System]

Figure 1:
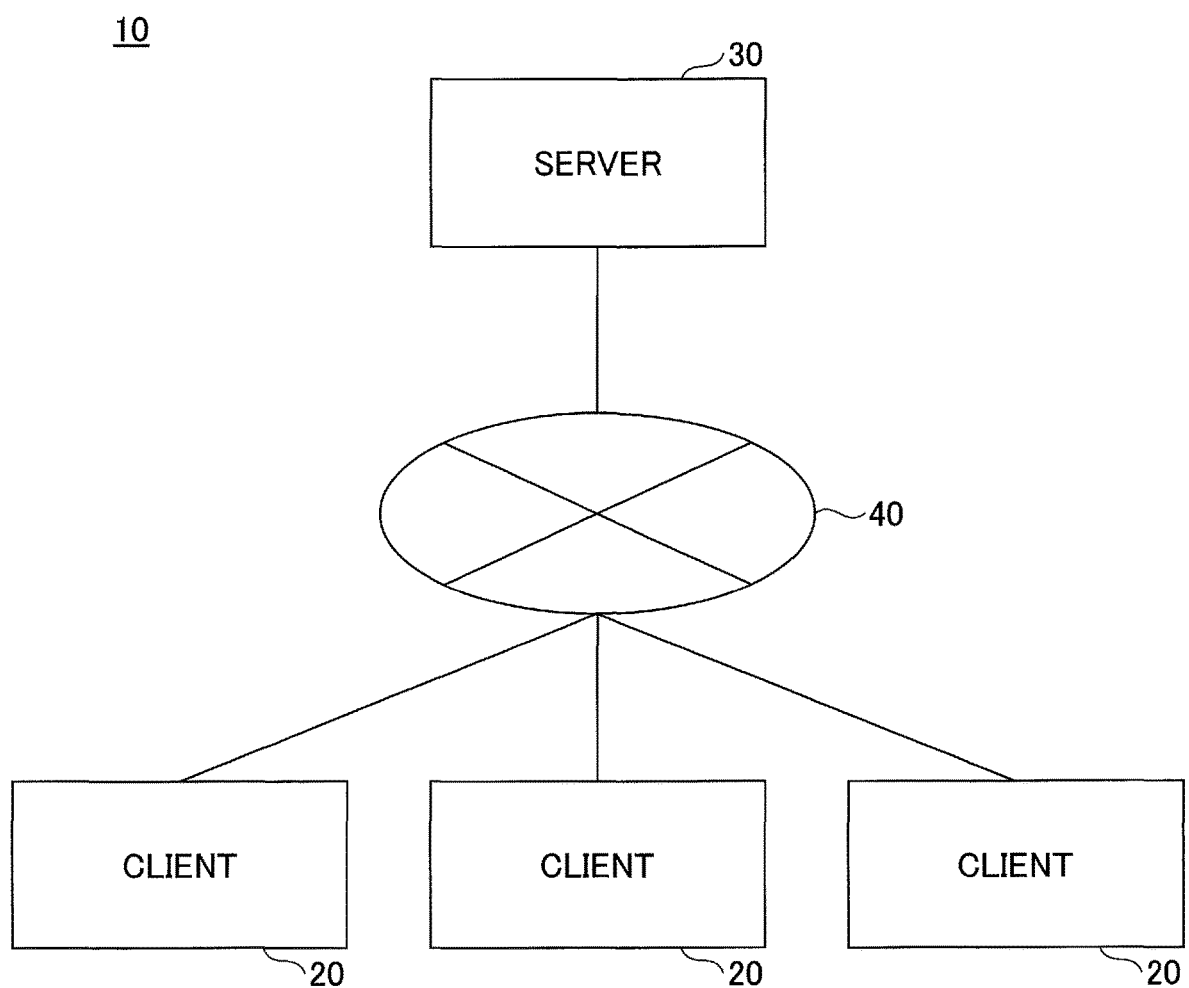
FIG. 1 is a diagram illustrating an example of a game system according to an embodiment.

First, a game system 10 according to an embodiment will be described with reference to FIG. 1. The game system 10 according to the present embodiment includes clients 20 and a server 30, which are communicatively connected via a network 40.

Each of the clients 20 is an example of an information processing apparatus in which a player plays a game. Examples of the information processing apparatus include a cellular phone such as a smartphone, a handheld game console, a personal computer, a tablet computer, a home video game console, and an arcade machine. Each of the clients 20 receives operations from a player with a touch panel, a controller, a mouse, a keyboard, or the like, to cause the player to play the game. It should be noted that the number of the clients 20 is not limited to three, and may be other than three.

The server 30 is an example of an information processing apparatus that provides the clients 20 with functions necessary for a game by transmitting and receiving data to and from the clients 20. The server 30 may be implemented by a cloud computer. The number of the server 30 illustrated in FIG. 1 is not limited to one. Two or more servers may be used for distributed processing.

For example, the server 30 is used to cause the clients 20 to download game programs (applications), is used to process player logins, and is used to manage player information and game scores.

Figure 2:
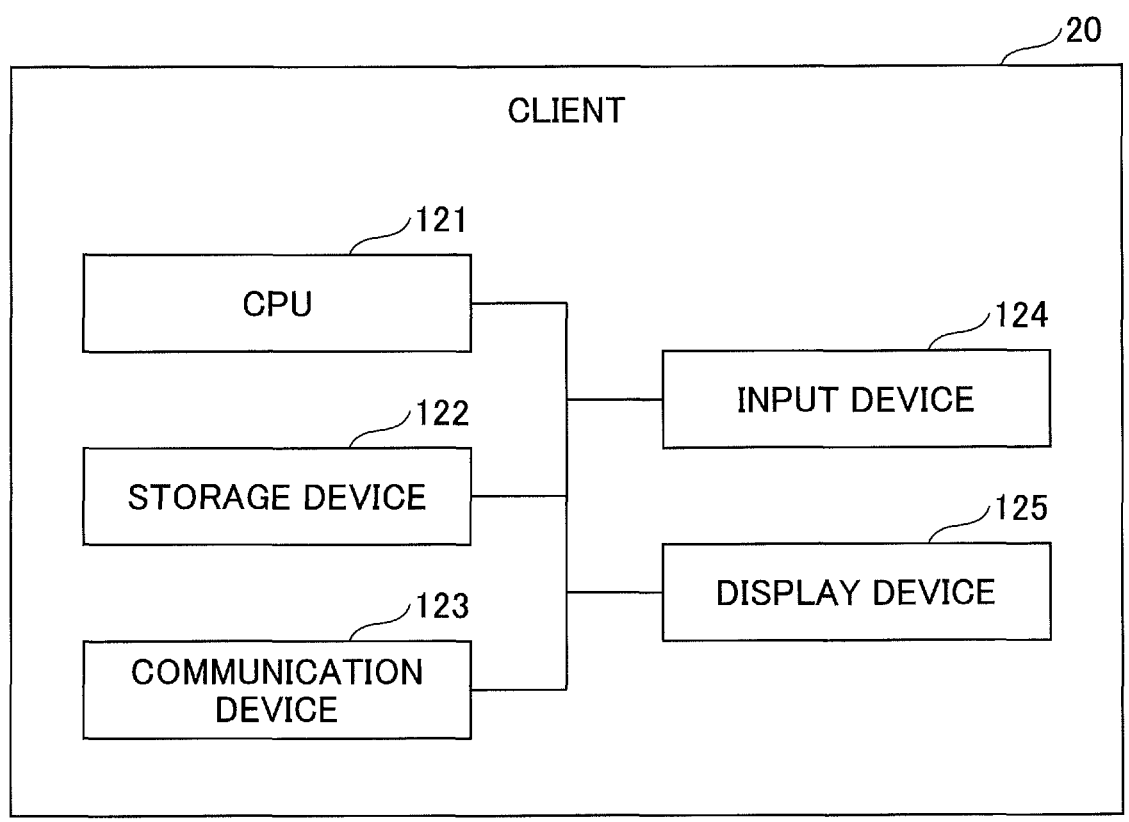
FIG. 2 is a diagram illustrating an example of a hardware configuration of a client according to an embodiment.

FIG. 2 is a diagram illustrating an example of a hardware configuration of a client 20. The client 20 includes a CPU (central processing unit) 121, a storage device 122, a communication device 123, an input device 124, and a display device 125. The CPU 121 controls the client 20. The storage device 122 may be, for example, a memory such as a read-only memory (ROM) or a random-access memory (RAM), or a storage device such as a hard disk drive (HDD) or a solid-state drive (SSD).

The communication device 123 is a communication device such as a network card that controls communication. The input device 124 is an input device such as a touchpad, a controller, a mouse, a keyboard, a camera, or a microphone. The display device 125 is an output device such as a display or a speaker. A touch panel is implemented by combining a touch pad and a display.

Figure 3:
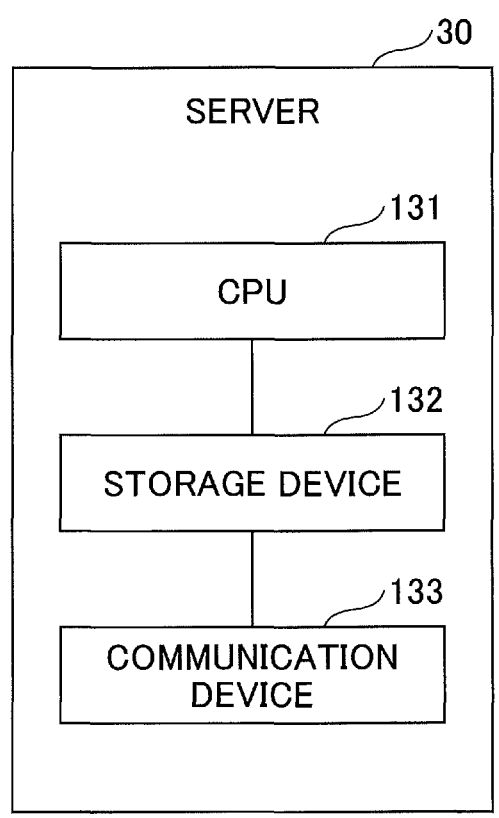
FIG. 3 is a diagram illustrating an example of a hardware configuration of a server according to an embodiment.

FIG. 3 is a diagram illustrating an example of a hardware configuration of the server 30. The server 30 includes a CPU 131, a storage device 132, and a communication device 133. The CPU 131 controls the server 30. The storage device 132 is a memory such as a ROM or a RAM, or a storage device such as an HDD or an SSD. The communication device 133 is a communication device such as a network card that controls communication.

Figure 4:
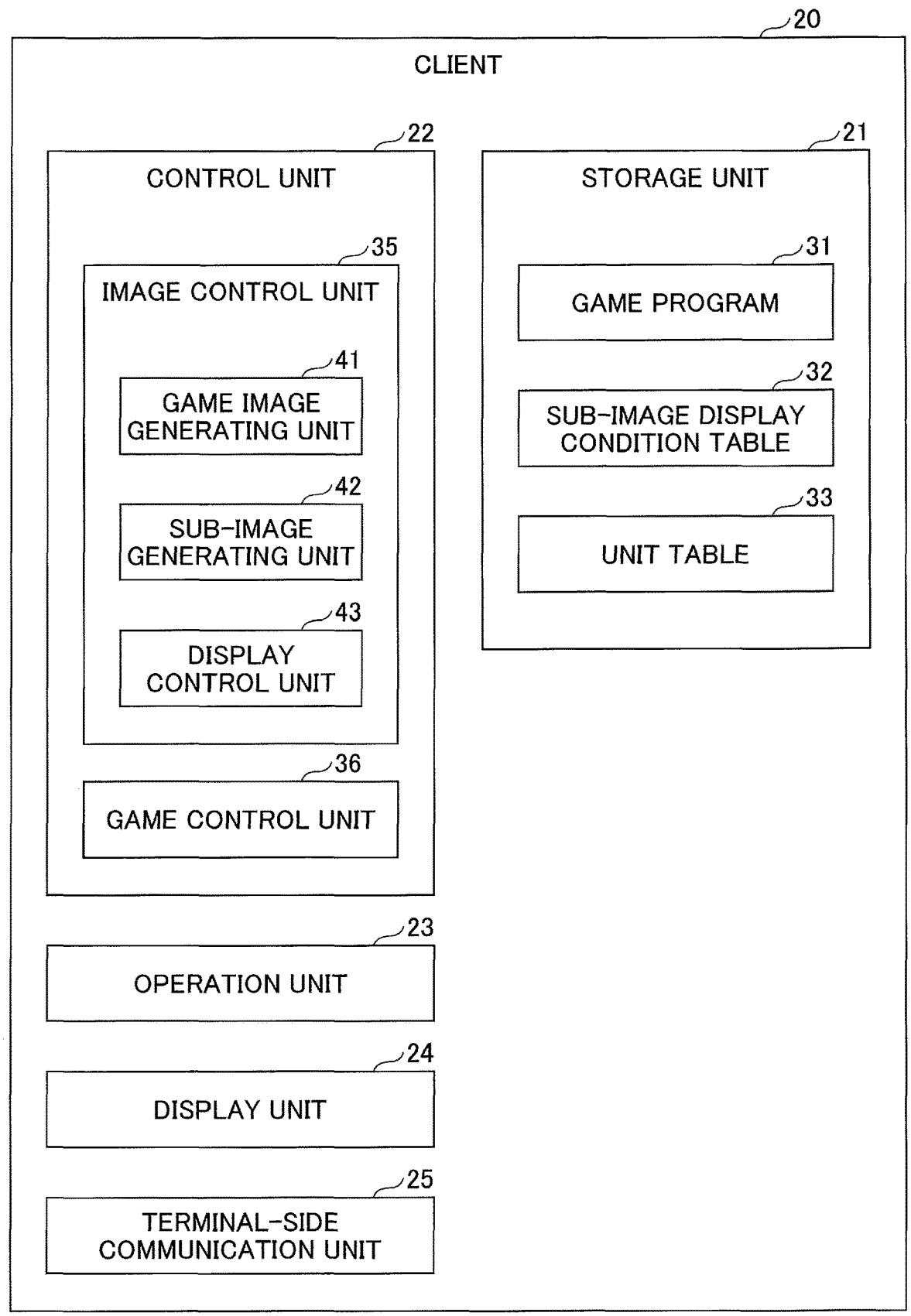
FIG. 4 is a diagram illustrating an example of a functional configuration of the client according to an embodiment.

FIG. 4 is a diagram illustrating an example of a functional configuration of the client 20. The client 20 includes a storage unit 21, a control unit 22, an operation unit 23, a display unit 24, and a terminal-side communication unit 25. The storage unit 21 stores programs such as a game program 31, data used by the programs, a sub-image display condition table 32, which will be described later, and a unit table 33. The storage unit 21 may be implemented by the storage device 122, or may be implemented by a storage device connected via the network 40.

Referring back to FIG. 4, the control unit 22 controls the entirety of the client 20. The control unit 22 is implemented by the CPU 121 executing processes written in the game program 31. The control unit 22 includes an image control unit 35 and a game control unit 36. The image control unit 35 performs control related to game images and sub-images. In the present embodiment, the term "sub-image" refers to an image displayed as a small window on a game image such that the image is superimposed on a part of the game image. In the present embodiment, the "sub-image" is displayed, as a small window, at a corner of the game image. The game control unit 36 controls the entirety of a game played by a player.

The image control unit 35 includes a game image generating unit 41, a sub-image generating unit 42, and a display control unit 43. The game image generating unit 41 generates a game image in accordance with the player's operation. The sub-image generating unit 42 generates a sub-image of another player's character based on the sub-image display condition table, which will be described later, when the other player's character is in a knocked-out state or in a paralyzed state. Each of the knocked-out state and the paralyzed state is an example of a state to be affected by the player character in a game or a state to be affected by the approach of the player character in a game. For example, in the present embodiment, when another player's character is in a knocked-out state, the sub-image generating unit 42 generates a sub-image indicating that the other player's character is in a knocked-out state. By displaying a sub-image on a game image, it becomes possible for the player to readily recognize that the other player's character is in a knocked-out state, and to cause the player character to approach and rescue the other player's character. Further, based on the sub-image display condition table, which will be described later, the display control unit 43 controls the timing and interval at which a sub-image is superimposed and displayed on a game image.

The operation unit 23 receives various operations of the input device 124 by the player. The display unit 24 displays game images and sub-images on the display device 125. The operation unit 23 is implemented by the CPU 121 controlling the input device 124. Further, the display unit 24 is implemented by the CPU 121 controlling the display device 125.

As used herein, various operations of the input device 124 by the player refer to operations in which the player controls the operation unit 23 in order to cause the CPU 121 to execute processes. The operation unit 23 receives various operations from the player playing a game. The control unit 22 progresses the game based on the various operations received from the player. The display unit 24 displays game images and sub-images generated by the control unit 22. The terminal-side communication unit 25 performs communication with the server 30. The terminal-side communication unit 25 is implemented by the CPU 121 executing the game program 31 and controlling the communication device 123 in accordance with the game program 31.

Figure 5:
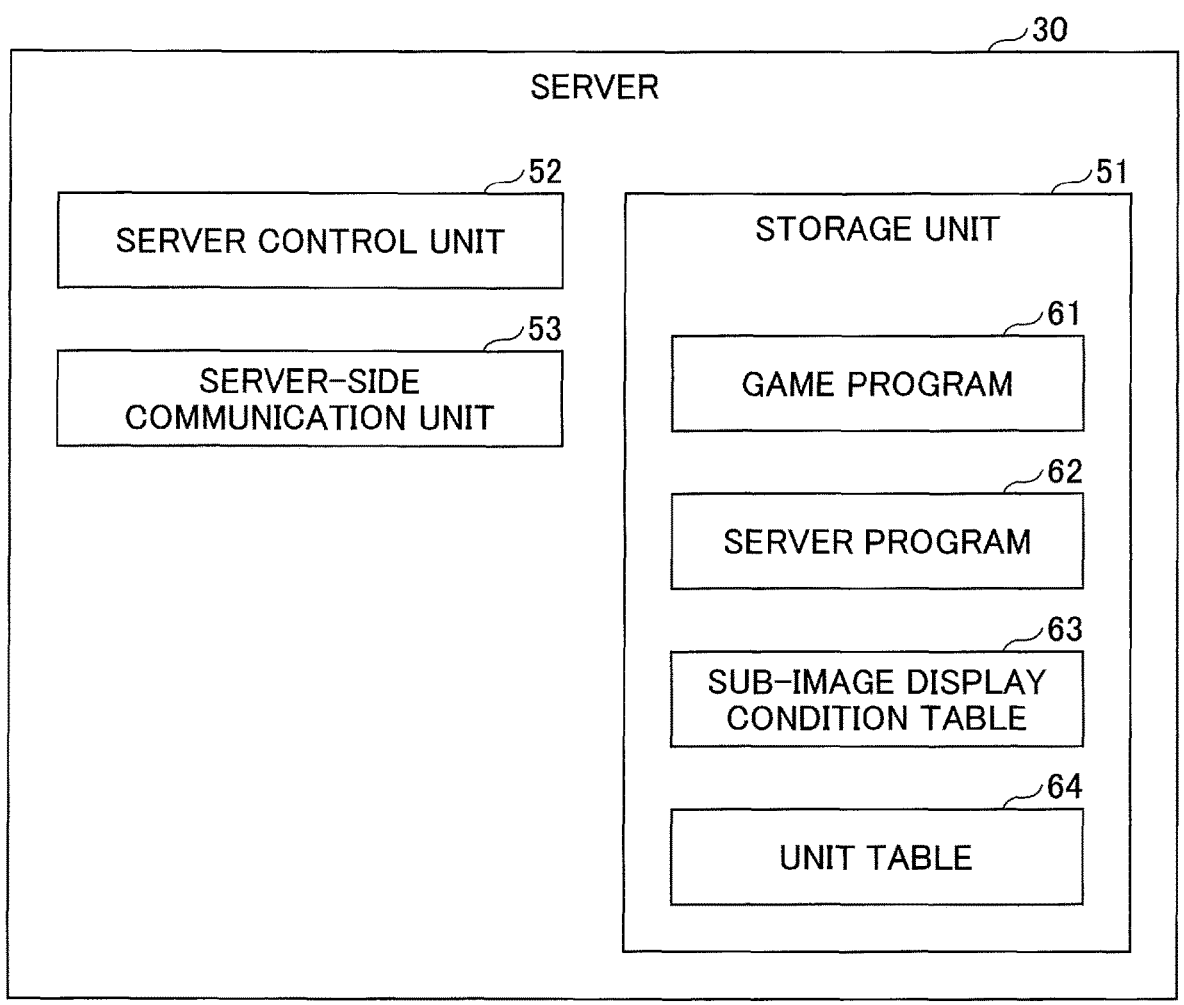
FIG. 5 is a diagram illustrating an example of a functional configuration of the server according to an embodiment.

FIG. 5 is a diagram illustrating an example of a functional configuration of the server 30. The server 30 illustrated in FIG. 5 includes a storage unit 51, a server control unit 52, and a server-side communication unit 53. The storage unit 51 stores programs such as a game program 61 and a server program 62, data used by the programs, a sub-image display condition table 63, which will be described later, and a unit table 64. The storage unit 51 may be implemented by the storage device 132, or may be implemented by a storage device connected via the network 40.

Referring back to FIG. 5, the server control unit 52 controls the entirety of the server 30. The server control unit 52 is implemented by the CPU 131 executing processes written in the server program 62.

For example, the server control unit 52 performs a download process that causes the client 20 to download the game program 61 stored in the storage unit 51, data used by the game program 61, the sub-image display condition table 63, which will be described later, and the unit table 64.

The server-side communication unit 53 communicates with the client 20. The server-side communication unit 53 is implemented by the CPU 131 executing the server program 62 and controlling the communication device 133 in accordance with the server program 62.

The sub-image display condition table 32 of the client 20 and the sub-image display condition table 63 of the server 30 include conditions for generating a sub-image. The unit table 33 of the client 20 and the unit table 64 of the server 30 include information of units such as player characters and non-player characters (NPCs) engaging in cooperative play. In the following, the sub-image display condition table 32 and the unit table 33 of the client 20 will be described.

FIG. 6 illustrates an example of the sub-image display condition table 32. The game system 10 according to the present embodiment uses the sub-image display condition table 32 of FIG. 6 to superimpose and display a sub-image on a game image.

The sub-image display condition table 32 includes items such as "state", "display timing", and "interval". The "state" indicates a state in which a sub-image of a player character or an NPC is generated, namely indicates a condition for generating a sub-image of a player character or an NPC. Accordingly, when the state of another player's character or an NPC matches any state indicated in the sub-image display condition table, a condition for generating a sub-image is satisfied.

The item "display timing" indicates a timing at which a sub-image of another player's character or an NPC, which has satisfied a condition for generating a sub-image, is displayed. For example, if the state of another player's character or an NPC is changed to a given state included in the item "state", and "immediately after state is changed" is set in the item "display timing", a sub-image of the other player's character or the NPC is displayed immediately after the state of the other player's character or the NPC is changed to the given state. Further, if the state of another player's character or an NPC is changed to a given state included in the item "state", and "30 seconds after state is changed" is set in the item "display timing", a sub-image of the other player's character or the NPC is displayed 30 seconds after the state of the other player's character or the NPC is changed to the given state. Note that a sub-image displayed in accordance with the "display timing" is made invisible after a predetermined period of time (after 3 seconds, for example). Accordingly, the player can focus on his/her gameplay while also checking sub-images of other players.

The item "interval" indicates an interval at which a sub-image is repeatedly displayed. If "every 10 seconds" is set in the "interval", the sub-image is displayed every 10 seconds. Further, if the "interval" is not set, the sub-image may be made invisible after a predetermined period of time (after 3 seconds, for example), or may be continuously displayed while a condition for generating a sub-image is satisfied.

FIG. 7 illustrates an example of the unit table 33. The game system 10 according to the present embodiment uses the unit table 33 to superimpose and display a sub-image on a game image.

The unit table 33 includes items such as "unit ID", "unit type", "state", and "current coordinates". The "unit ID" is an example of identification information for uniquely identifying a unit such as a player character or an NPC engaging in cooperative play. The "unit type" indicates the type of a unit, such as a player character, a NPC, or an object. The unit type "object" is an in-game object (such as a building) whose state changes to a state such as "low hit points" or "low durability".

The item "state" indicates the state of a unit such as a player character or an NPC engaging in cooperative play. States set in the item "state" of the sub-image display condition table of FIG. 6 are included in the item "state" of FIG. 7. The item "current coordinates" indicates coordinates of an in-game area where a unit such as a player character or an NPC engaging in cooperative play is located.

As described above, the sub-image generating unit 42 uses the sub-image display condition table 32 of FIG. 6 and the unit table 33 of FIG. 7 to generate a sub-image of a unit such as another player's character or an NPC, which has satisfied a condition for generating a sub-image. Further, the display control unit 43 uses the sub-image display condition table 32 of FIG. 6 and the unit table 33 of FIG. 7 to control the timing and interval at which a sub-image is displayed.

[Process Flow]

Figure 8:
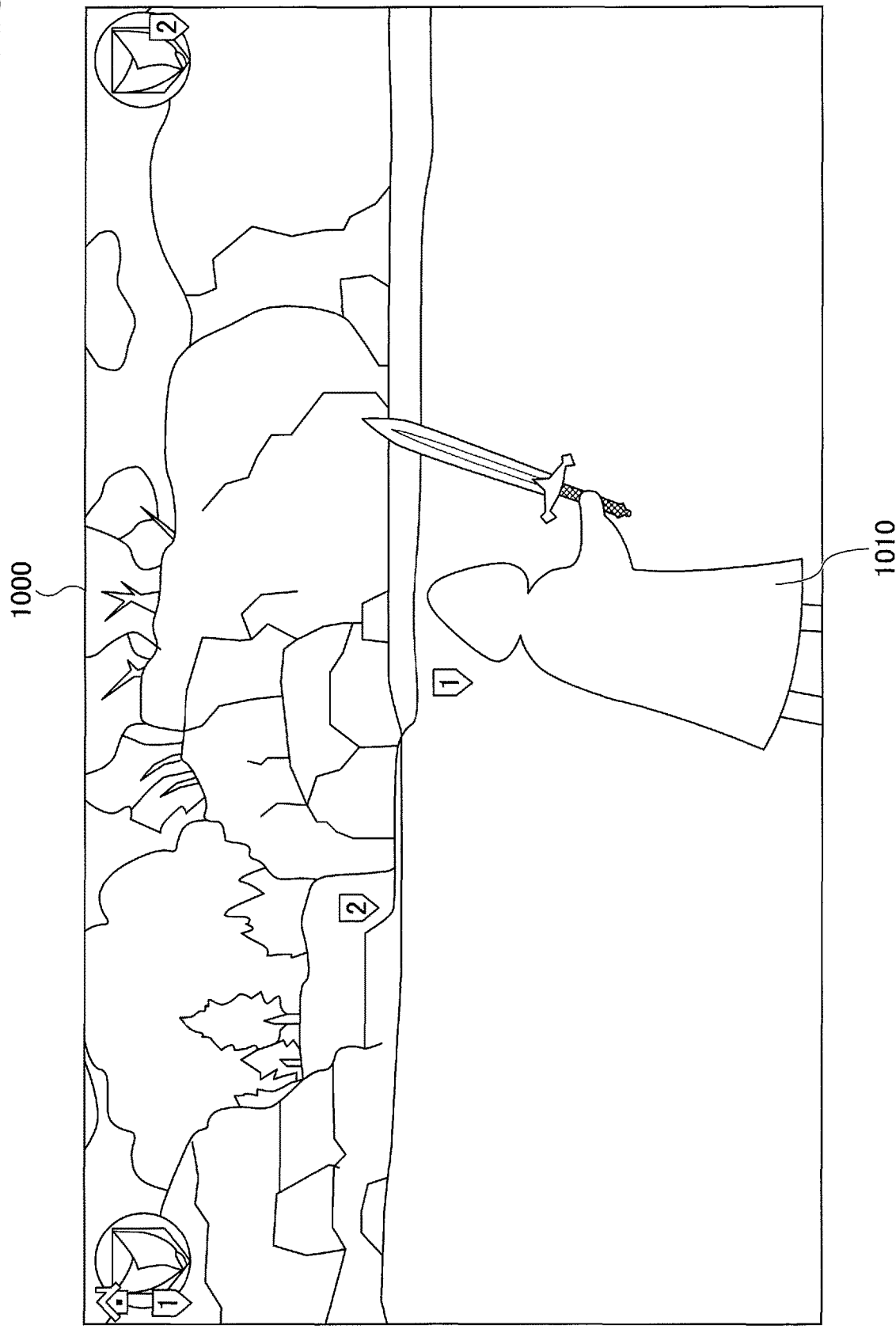
FIG. 8 is a diagram illustrating an example of a game image before a sub-image is displayed according to an embodiment.

Next, a process for superimposing and displaying a sub-image on a game image of a game played by a player who operates the client 20 will be described. FIG. 8 is a diagram illustrating an example of a game image 1000 before a sub-image is displayed according to an embodiment. The game image 1000 of FIG. 8 displays a player character 1010 controlled by the player. The player advances the game by controlling the player character 1010. In the following, an example in which the player character 1010 cooperates with another player's character (a character 1110, which will be described later) to fight will be described. In the fight, the state of each of the player character 1010 and the character 1110 changes from a normal state to a state such as "knocked-out", "paralyzed", or "low hit points". For example, in FIG. 8, information on the state of the player character 1010 is displayed at the top left, and information on the state of the character 1110 is displayed at the top right.

In a case where the player character 1010 or the character 1110 is in the knocked-out state, the player character 1010 or the character 1110 can recover from the knocked-out state when another character engaging in cooperative play approaches and rescues the player character 1010 or the character 1110. However, if a time limit (such as 100 seconds) is exceeded, the player character 1010 or the character 1110 is unable to recover from the knockout state. Accordingly, it is desirable to readily identify whether other characters in cooperative play are knocked out.

In addition, it may be desirable to readily identify whether there is a paralyzed character or a character with low hit points, such that another character engaging in cooperative play can approach and rescue the character.

Figure 9:
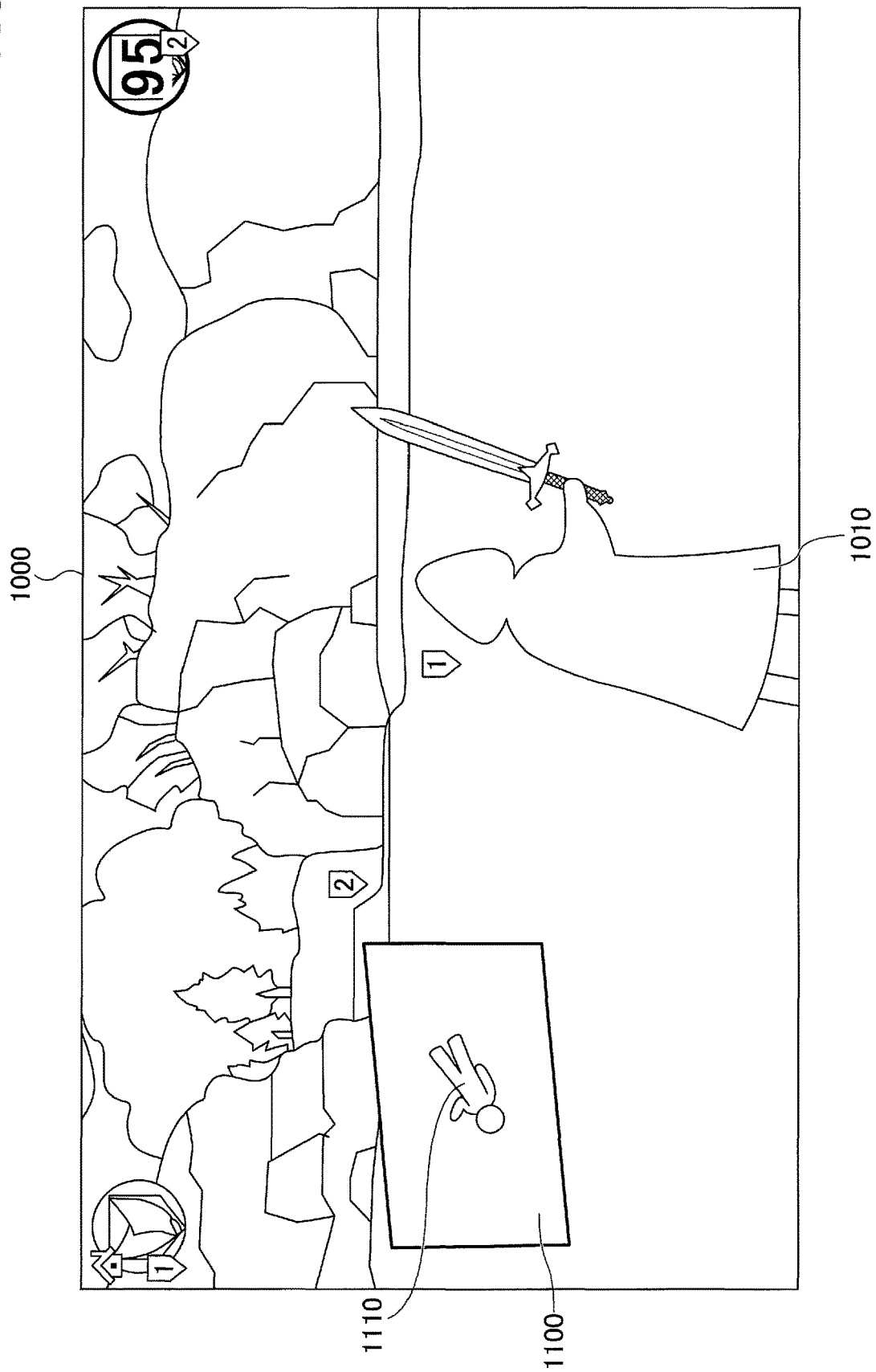
FIG. 9 is a diagram illustrating an example of the game image after the sub-image is displayed according to an embodiment.

In light of the above, in the present embodiment, as illustrated in FIG. 9, if the character 1110 engaging in cooperative play is knocked out, a mark indicating the knocked-out state and also the remaining time limit are displayed at the top right as information on the state of the character 1110, and also a sub-image 1100 indicating that the character 1110 is knocked out is displayed. FIG. 9 is a diagram illustrating an example of the game image 1000 after the sub-image 1100 is displayed. By displaying the sub-image 1100, it becomes possible for the player of the player character 1010 to readily recognize that the character 1110 in cooperative play is knocked out. Note that the remaining time limit may be displayed in the sub-image 1100.

Figure 10:
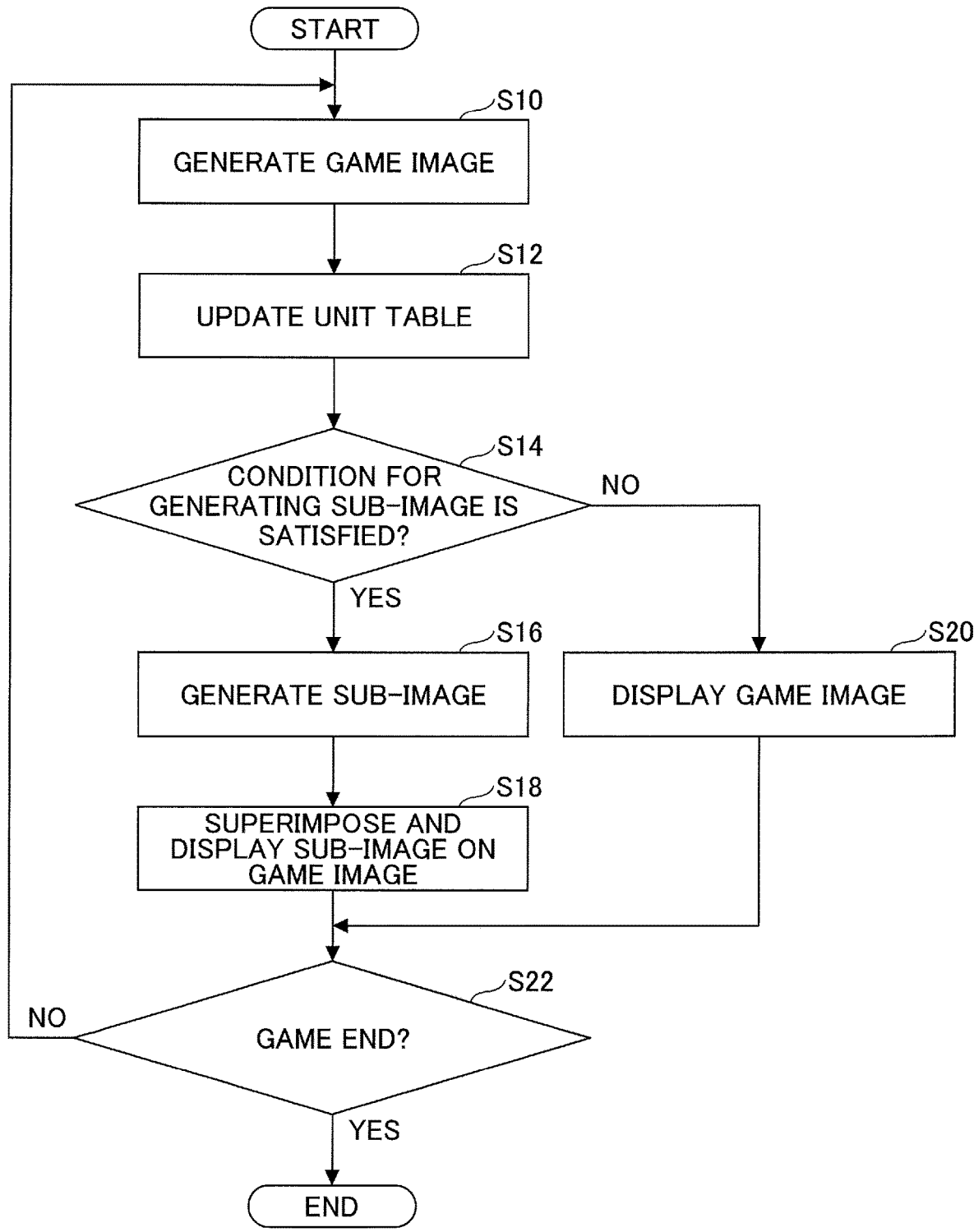
FIG. 10 is a flowchart of an example of a process for displaying a sub-image in the game system according to an embodiment.

FIG. 10 is a flowchart of an example of a process for displaying a sub-image 1100 in the game system 10 according to an embodiment. In the game system 10, the process illustrated in FIG. 10 is performed such that a game image 1000 as illustrated in FIG. 8 or FIG. 9 is displayed while players play a game. In the present embodiment, a process for superimposing and displaying the sub-image 1100 on the game image 1000 will be mainly described, and a description of other processes will be omitted as appropriate.

The game image generating unit 41 of the client 20 generates a game image 1000 of a game that progresses in accordance with the operations performed by one or more players (S10). The game control unit 36 updates the unit table 33 of FIG. 7 in accordance with the progress of the game (S12). For example, if the state of a character is changed as the game progresses, the game control unit 36 updates the state of the character in the unit table 33 to the changed state. Accordingly, if the state of the character 1110 is changed to "knocked-out", the state of the character 1110 in the unit table 33 is updated to "knocked-out".

The sub-image generating unit 42 determines whether there is a unit that satisfies a condition for generating a sub-image in the unit table 33 (S14).

When it is determined that there is a unit that satisfies a condition for generating a sub-image, the sub-image generating unit 42 generates a sub-image 1100 of the unit (S16). Then, as illustrated in FIG. 9, the display control unit 43 superimposes and displays the sub-image 1100 of the unit on the game image 1000 in accordance with the display timing and interval corresponding to the state of the unit and specified in the sub-image display condition table 32 of FIG. 6 (S18).

For example, as illustrated in the unit table 33 of FIG. 7, it is assumed that a player who controls a player character having a unit ID "u001" and a player who controls a player character having a unit ID "u002" engage in cooperative play.

In a game image 1000 of the player who controls the player character having the unit ID "u001", it is determined that the unit having the unit ID "u002" satisfies a condition for generating a sub-image based on the sub-image display condition table of FIG. 6, because the state of the player character having the unit ID "u002" is "knocked-out".

Therefore, a sub-image 1100 indicating that the character 1110, serving as the unit having the unit ID "u002", is knocked out is displayed on the game image 1000 of the player who controls the player character having the unit ID "u001".

If there is no unit that satisfies a condition for generating a sub-image, the sub-image generating unit 42 does not generate a sub-image 1100. Then, the display control unit 43 displays a game image 1000 as illustrated in FIG. 8 (S20). The client 20 repeats steps S10 through S22 until the game ends.

Note that the display format of the sub-image 1100 illustrated in FIG. 9 is merely an example. The display format such as the size and the color of the sub-image 1100 may vary in accordance with the distance between the character 1010 of the player who operates the client 20 and the character 1110 displayed in the sub-image 1100.

For example, when the distance between the player character 1010 of the player who operates the client 20 and the character 1110 displayed in the sub-image 1100 is far away, it takes time for the player character 1010 to approach the character 1110. Therefore, the size of the sub-image 1100 may be increased such that the player of the player character 1010 can readily recognize that the character 1110 is knocked out.

In addition, when the distance between the player character 1010 of the player who operates the client 20 and the character 1110 displayed in the sub-image 1100 is far away, the color of the sub-image 1100 may be changed to a conspicuous color such that the player of the player character 1010 can readily recognize that the character 1110 is knocked out.

Further, when a time limit during which a character can recover from knockout is set, the display format such as the size and the color of the sub-image 1100 may vary in accordance with the remaining time limit. For example, when the time limit is approaching, the possibility of the character not being able to recover from knockout becomes high. Therefore, the size of the sub-image 1100 may be increased such that the knocked-out character is readily recognizable. Further, when the time limit is approaching, the color of the sub-image 1100 may be changed to a conspicuous color such that the knocked-out character is readily recognizable.

In the above-described embodiments, an example in which the player character 1010 approaches the other character 1110 engaging in cooperative play to rescue the other character 1110 has been described; however, the player character 1010 is not required to approach the other character 1110 to rescue the other character 1110. In order to rescue the other character 1110, the player character 1010 may approach a unit other than the character 1110, such as a temple or any other object. In addition, the application of the game system 10 according to the above-described embodiments is not limited to cooperative play, and the game system 10 according to the above-described embodiments may be applied to a player character 1010 participating in a massively multiplayer online (MMO) game. Further, a sub-image 1100 of an NPC controlled to protect a player character during an escort quest may be displayed.

According to the above-described embodiments, it is possible to provide a new mechanism that superimposes and displays, on a game image 1000, a sub-image 1100 of another character 1110 that can be rescued by the approach of a player character 1010.

It is to be understood that the game system 10, the clients 20, and the server 30 according to the disclosed embodiments are exemplary and are not restrictive in all respects. The embodiments described above can be modified and improved in various forms without departing from the appended claims and the spirit thereof. The matters described in the above-described embodiments can be combined to an extent consistent with other configurations.

What is claimed is:

1. An information processing apparatus in which a player plays a game by controlling a player character, the information processing apparatus comprising:
   a memory; and
   a processor coupled to the memory and configured to
      generate a game image in accordance with an operation by the player,
      generate another image of another character or an object other than the player character, in a case where the another character or the object is in a state to be affected by the player character in the game,
      superimpose and display the another image on the game image, and
      cause the another image superimposed and displayed on the game image to be invisible after a lapse of a predetermined period of time.

2. The information processing apparatus according to claim 1, wherein the processor generates the another image of the another character or the object other than the player character, in a case where the another character or the object is in a state to be affected by approach of the player character in the game.

3. The information processing apparatus according to claim 1, wherein the processor superimposes and displays the another image on the game image at a time when the another character or the object enters the state.

4. The information processing apparatus according to claim 1, wherein the processor superimposes and displays the another image on the game image at a time when a predetermined period of time elapses after the another character or the object enters the state.

5. The information processing apparatus according to claim 1, wherein the processor varies a display format of the another image in accordance with a distance between the player character and the another character or the object, and displays the another image on the game image.

6. The information processing apparatus according to claim 1, wherein, in a case where a time limit is associated with the state, the processor varies a display format of the another image in accordance with a remaining time limit, and displays the another image on the game image.

7. The information processing apparatus according to claim 1, wherein the another character is controlled by another player, the another player engaging in cooperative play with the player controlling the player character.

8. An information processing method performed in an information processing apparatus in which a player plays a game by controlling a player character, the information processing method comprising:
   generating a game image in accordance with an operation by the player;
   generating another image of another character or an object other than the player character, in a case where the another character or the object is in a state to be affected by the player character in the game;
   superimposing and displaying the another image on the game image; and
   causing the another image superimposed and displayed on the game image to be invisible after a lapse of a predetermined period of time.

9. A non-transitory computer readable storage medium storing a program for causing an information processing apparatus, in which a player plays a game by controlling a player character, to execute a process comprising:
   generating a game image in accordance with an operation by the player; generating another image of another character or an object other than the player character, in a case where the another character or the object is in a state to be affected by the player character in the game;
   superimposing and displaying the another image on the game image; and
   causing the another image superimposed and displayed on the game image to be invisible after a lapse of a predetermined period of time.

* * * * *